United States Patent
Wang et al.

(10) Patent No.: US 10,817,399 B2
(45) Date of Patent: Oct. 27, 2020

(54) PRINTED CIRCUIT BOARD, MAIN BOARD, AND SYSTEM AND METHOD FOR MONITORING TEMPERATURE

(71) Applicant: ZHENGZHOU YUNHAI INFORMATION TECHNOLOGY CO., LTD., Zhengzhou, Henan (CN)

(72) Inventors: Lin Wang, Henan (CN); Xiaolei Wang, Henan (CN)

(73) Assignee: ZHENGZHOU YUMHAI INFORMATION TECHNOLOGY CO., LTD., Zhengzhou, Henan (CN)

( * ) Notice: Subject to any disclaimer, the term of this patent is extended or adjusted under 35 U.S.C. 154(b) by 113 days.

(21) Appl. No.: 16/096,616

(22) PCT Filed: Jul. 21, 2017

(86) PCT No.: PCT/CN2017/093867
§ 371 (c)(1),
(2) Date: Oct. 25, 2018

(87) PCT Pub. No.: WO2018/107754
PCT Pub. Date: Jun. 21, 2018

(65) Prior Publication Data
US 2019/0138418 A1   May 9, 2019

(30) Foreign Application Priority Data

Dec. 14, 2016   (CN) .......................... 2016 1 1151346

(51) Int. Cl.
  *G06F 11/30* (2006.01)
  *G06F 1/20* (2006.01)
  (Continued)

(52) U.S. Cl.
  CPC ........ *G06F 11/3058* (2013.01); *G06F 1/1684* (2013.01); *G06F 1/185* (2013.01);
  (Continued)

(58) Field of Classification Search
None
See application file for complete search history.

(56) References Cited

U.S. PATENT DOCUMENTS 7,075,788 B2 * 7/2006 Larson ...................... G06F 1/20
                                                       165/185
2005/0122680 A1 * 6/2005 Ozawa ................... H05K 7/207
                                                      361/679.49

(Continued)

FOREIGN PATENT DOCUMENTS

| CN | 103473166 A | 12/2013 |
| CN | 105843093 A | 8/2016 |
| CN | 106598807 A | 4/2017 |

OTHER PUBLICATIONS

International Search Report for PCT/CN2017/093867 dated Oct. 18, 2017, ISA/CN.

*Primary Examiner* — Fahmida Rahman
(74) *Attorney, Agent, or Firm* — Yue (Robert) Xu; Apex Attorneys at Law, LLP

(57) ABSTRACT

A board, a mainboard, and a system and method for monitoring a temperature are provided. The board includes one or more temperature sensors and a connecting finger. The one or more temperature sensors are integrated on the board and are connected to the connecting finger. The connecting finger is plugged with a slot on an external mainboard to connect the board to the mainboard. Each of the one or more temperature sensors is configured to: convert an acquired ambient temperature to a current value, and output the current value to the mainboard in a case that the connecting finger is plugged with the slot.

10 Claims, 4 Drawing Sheets

(51) Int. Cl.
*G06F 1/18* (2006.01)
*G06F 1/16* (2006.01)

(52) U.S. Cl.
CPC ............ *G06F 1/20* (2013.01); *G06F 11/3031* (2013.01); *G06F 11/3055* (2013.01)

(56) References Cited

U.S. PATENT DOCUMENTS

| | | | |
|---|---|---|---|
| 2006/0290366 A1* | 12/2006 | Kon | G01R 31/2874 324/750.06 |
| 2007/0139004 A1 | 6/2007 | Satsuma | |
| 2007/0230123 A1* | 10/2007 | Hata | H05K 7/207 361/695 |
| 2015/0045936 A1* | 2/2015 | Alley | H01L 21/02 700/121 |

* cited by examiner

US 10,817,399 B2

PRINTED CIRCUIT BOARD, MAIN BOARD, AND SYSTEM AND METHOD FOR MONITORING TEMPERATURE

The present application is the national phase of PCT International Patent Application PCT/CN2017/093867, filed on Jul. 21, 2017 which claims the priority to Chinese Patent Application No. 201611151346.7, titled "PRINTED CIRCUIT BOARD, MAIN BOARD, AND SYSTEM AND METHOD FOR MONITORING TEMPERATURE", filed with the Chinese Patent Office on Dec. 14, 2016, both of which are incorporated herein by reference in their entireties.

FIELD

The present disclosure relates to the technical field of computers, and in particular to a board, a mainboard, and a system and method for monitoring a temperature.

BACKGROUND

With the development of cloud computing and big data, servers and other related products have more and more functions, and heat dissipation of a system becomes more and more important.

At present, for each temperature monitoring point on a mainboard, a temperature sensor may be soldered on the temperature monitoring point to acquire a temperature at the point in a real time manner. The mainboard may control a fan to perform heat dissipation processing based on the real time change of the temperature.

Since the temperature sensor is integrated on the mainboard, data acquisition of the temperature sensor is interfered by heat generated by a current in the mainboard, and thus the change of the temperature cannot accurately reflect the heat actually generated by the mainboard. Therefore, in the conventional technology, the temperature monitoring accuracy is low.

SUMMARY

There are provided a board, a mainboard, and a system and method for monitoring a temperature in the present disclosure, to improve the temperature monitoring accuracy.

In order to achieve the above objects, the following technical solutions are provided in the present disclosure.

In a first aspect, a board is provided in the present disclosure, which includes one or more temperature sensors, and a connecting finger, the one or more temperature sensors are integrated on the board and are connected to the connecting finger;

the connecting finger is arranged to be plugged with a slot on an external mainboard to connect the board to the mainboard; and each of the one or more temperature sensors is configured to: convert an acquired temperature around the temperature sensor to a current value, and output the current value to the mainboard in a case that the connecting finger is plugged with the slot.

Further, the one or more temperature sensors include two temperature sensors respectively soldered on a front surface and a back surface of the board, and in the case that the connecting finger is plugged with the slot, a plane of the board is perpendicular to a plane of the mainboard, and an angle between the plane of the board and an airflow direction around the mainboard is not greater than a preset threshold.

Further, the connecting finger includes: a first serial clock line (SCL) pin; a first serial data line (SDA) pin; a first ground pin; a first power supply pin; and a first alert (ALERT) pin, in the case that the connecting finger is plugged with the slot, the first SCL pin is connected to a SCL pin in the slot, the first SDA pin is connected to a SDA pin in the slot, the first ground pin is connected to a ground pin in the slot, the first power supply pin is connected to a power supply pin in the slot, and the first ALERT pin is connected to an ALERT pin in the slot;

each of the one or more temperature sensors includes a processing chip, and the processing chip includes: a second SCL pin connected to the first SCL pin, a second SDA pin connected to the first SDA pin, a second ground pin connected to the first ground pin, a second power supply pin connected to the first power supply pin, and a second ALERT pin connected to the first ALERT pin; and each of the one or more temperature sensors is configured to: convert the current value to a binary code by using the processing chip; output the binary code to the mainboard via the second SCL pin and the second SDA pin in the processing chip in the case that the connecting finger is plugged with the slot; and output an alert signal to the mainboard via the second ALERT pin in the processing chip by using the processing chip if it is determined that the current value is not in a preset threshold range and the connecting finger is plugged with the slot.

Further, the one or more temperature sensors include a first temperature sensor and a second temperature sensor connected in series with each other, the processing chip of the first temperature sensor further includes an address ADD pin connected to the second ground pin in the processing chip of the first temperature sensor;

the first temperature sensor is further configured to output a low level signal to the mainboard before the binary code is outputted to the mainboard;

the processing chip of the second temperature sensor further includes an ADD pin connected to the second power supply pin in the processing chip of the second temperature sensor; and the second temperature sensor is further configured to output a high level signal to the mainboard before the binary code is outputted to the mainboard.

In a second aspect, a mainboard is provided in the present disclosure, which includes: one or more slots, and a baseboard management controller (BMC), the BMC is connected to the one or more slots, each of the one or more slots is arranged to be plugged with a connecting finger on an external board to connect the board to the mainboard; and the BMC is configured to: receive, for each of the one or more slots, one or more current values outputted by a first board in a case that the slot is plugged with the connecting finger on the first board; determine a temperature around the first board based on the one or more current values; and determine whether one or more determined temperatures meet a predetermined temperature regulation requirement, and perform temperature control processing in a case that the one or more determined temperatures meet the predetermined temperature regulation requirement.

Further, the one or more slots include: a first slot at an air inlet of the mainboard and a second slot at an air outlet of the mainboard;

the one or more current values include two current values;

the temperature regulation requirement includes a first formula;

the first formula is expressed as:

$$\begin{cases} \Delta T = T_2 - T_1 - T_0 \\ \quad \Delta T > 0 \end{cases}$$

$\Delta T$ is a temperature control difference; T2 is a temperature around a board when the second slot is plugged with a connecting finger on the board; T1 is a temperature around another board when the first slot is plugged with a connecting finger on the board; T0 is a preset standard difference; and the BMC is configured to: determine, based on a predetermined conversion curve between different current values and different temperatures, a temperature corresponding to an average of the two current values as a temperature around the first board; determine whether the two determined temperatures meet the first formula; and determine, based on a predetermined correspondence between different temperature control differences and different fan speeds, a target fan speed corresponding to a temperature control difference of the two temperatures and adjust a speed of an external fan to the target fan speed to perform the temperature control processing, in a case that the two determined temperatures meet the first formula.

Further, each of the one or more slots includes: a SCL pin, a SDA pin, a ground pin, a power supply pin, and an ALERT pin.

In a third aspect, a system for monitoring a temperature is provided in the present disclosure, which includes one or more boards described above, and the mainboard described above, for each of the one or more slots on the mainboard, in a case that the slot is plugged with a connecting finger on any one of the boards, the board is connected to the mainboard.

In a fourth aspect, there is provided a method for monitoring a temperature with the system for monitoring a temperature described above in the present disclosure, which includes:

plugging the one or more slots on the mainboard with connecting fingers on the one or more boards, respectively, to connect the mainboard to the one or more boards;

converting, by each of the one or more temperature sensors integrated on each of the one or more boards, an acquired temperature around the temperature sensor to a current value, and output, by the temperature sensor, the current value to the mainboard;

receiving, by the baseboard management controller BMC on the mainboard, for each of the one or more boards, a current value outputted by each of the one or more temperature sensors integrated on the board, to obtain one or more current values, and determining, by the BMC, a temperature around the board based on the one or more current values; and determining, by the BMC, whether one or more determined temperatures meet a predetermined temperature regulation requirement, and performing temperature control processing in a case that the one or more determined temperatures meet the predetermined temperature regulation requirement.

Further, the one or more slots include: a first slot at an air inlet of the mainboard and a second slot at an air outlet of the mainboard;

the one or more current values include two current values;

the temperature regulation requirement includes a first formula;

the first formula is expressed as:

$$\begin{cases} \Delta T = T_2 - T_1 - T_0 \\ \quad \Delta T > 0 \end{cases}$$

$\Delta T$ is a temperature control difference; T2 is a temperature around a board when the second slot is plugged with a connecting finger on the board; T1 is a temperature around another board when the first slot is plugged with a connecting finger on the board; T0 is a preset standard difference;

the determining a temperature around the board based on the one or more current values includes: determining, based on a predetermined conversion curve between different current values and different temperatures, a temperature corresponding to an average of the two current values as the temperature around the board; and the determining whether one or more determined temperatures meet a predetermined temperature regulation requirement and performing temperature control processing in a case that the one or more determined temperatures meet the predetermined temperature regulation requirement includes: determining whether the two determined temperatures meet the first formula; and determining, based on a predetermined correspondence between different temperature control differences and different fan speeds, a target fan speed corresponding to a temperature control difference of the two temperatures and adjusting a speed of an external fan to the target fan speed to perform the temperature control processing, in a case that the two determined temperatures meet the first formula.

There are provided a board, a mainboard, and a system and method for monitoring a temperature in the present disclosure. The board includes one or more temperature sensors and a connecting finger. The one or more temperature sensors are integrated on the board and are connected to the connecting finger. The connecting finger is arranged to be plugged with a slot on an external mainboard to connect the board to the mainboard. Each of the one or more temperature sensors is configured to: convert an acquired temperature around the temperature sensor to a current value, and output the current value to the mainboard in a case that the connecting finger is plugged with the slot. The temperature sensor is connected to the mainboard via the plugging between the board and the mainboard, rather than being arranged on the mainboard, which reduces or avoids interference of heat generated by a current in the mainboard to data acquisition. Therefore, temperature monitoring accuracy can be improved with the present disclosure.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF THE EMBODIMENTS

In order to make objects, technical solutions and advantages of embodiments of the present disclosure more clear, the technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

Figure 1:
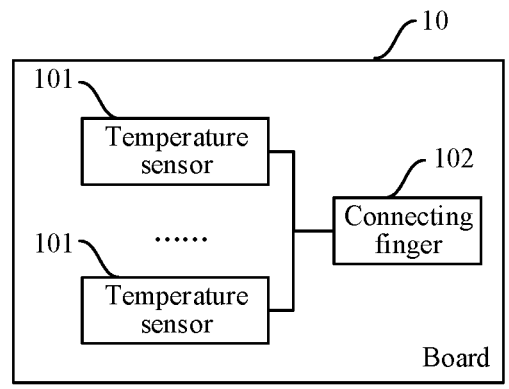
FIG. 1 is a schematic diagram of a board according to an embodiment of the present disclosure.

As shown in FIG. 1, a board 10 is provided according to an embodiment of the present disclosure.

The board 10 includes: one or more temperature sensors 101, and a connecting finger 102.

The one or more temperature sensors 101 are integrated on the board 10 and are connected to the connecting finger 102.

The connecting finger 102 is arranged to be plugged with a slot on an external mainboard to connect the board 10 to the mainboard.

Each of the one or more temperature sensors 101 is configured to: convert an acquired temperature around the temperature sensor to a current value, and output the current value to the mainboard in a case that the connecting finger 102 is plugged with the slot.

A board is provided according to an embodiment of the present disclosure, which includes one or more temperature sensors and a connecting finger. The one or more temperature sensors are integrated on the board and are connected to the connecting finger. The connecting finger is arranged to be plugged with a slot on an external mainboard to connect the board to the mainboard. Each of the one or more temperature sensors is configured to: convert an acquired temperature around the temperature sensor to a current value, and output the current value to the mainboard in a case that the connecting finger is plugged with the slot. The temperature sensor is connected to the mainboard via the plugging between the board and the mainboard, rather than being arranged on the mainboard, which reduces or avoids interference of heat generated by a current in the mainboard to data acquisition. Therefore, temperature monitoring accuracy can be improved with the embodiment of the present disclosure.

A power supply needs to be provided in the design of the mainboard. It can be seen from a formula expressed as $P=I^2R$ that heat is generated at a position where there is a current. If the temperature sensor is arranged on the mainboard, the data acquisition of the temperature sensor may be interfered by the heat generated by the current in the mainboard, which affects the data acquisition accuracy. Further, other modules on the mainboard may also generate heat, which also affects the data acquisition accuracy.

In order to solve or mitigate the above problems, in an embodiment of the present disclosure, the one or more temperature sensors included in the board may be directly soldered on the board and are directly connected to the mainboard via interface connection between the board and the mainboard, rather than being directly soldered on the mainboard.

Specifically, for any one temperature sensor, the temperature sensor is connected to the connecting finger, and the connection between the board and the mainboard is established in a case that the connecting finger is plugged with a slot. In this way, the temperature sensor may convert an acquired temperature to a current value and output the current value to the mainboard, and thus the mainboard may perform corresponding processing.

In an embodiment of the present disclosure, the one or more temperature sensors 101 include two temperature sensors respectively soldered on a front surface and a back surface of the board 10.

In the case that the connecting finger 102 is plugged with the slot, a plane of the board 10 is perpendicular to a plane of the mainboard, and an angle between the plane of the board 10 and an airflow direction around the mainboard is not greater than a preset threshold.

Specifically, the board generally has two surfaces including the front surface and back surface, and one or more temperature sensors may be soldered on each surface. For example, the one or more temperature sensors may be soldered in at least one of the following manners: one temperature sensor is soldered on the front surface of the board; one temperature sensor is soldered on the back surface of the board; one temperature sensor is soldered on each of the front surface and the back surface of the board; multiple temperature sensors are soldered on the front surface of the board; multiple temperature sensors are soldered on the back surface of the board; and multiple temperature sensors are soldered on both the front surface and the back surface of the board.

It can be seen that in the simplest way, one temperature sensor is soldered on any one surface of the board. In the case that the board is plugged with a slot at any one position on the mainboard, the soldered temperature sensor may acquire a current temperature around the temperature sensor and feed the current temperature back to the mainboard.

Further, in order to improve the data acquisition accuracy while taking factors such as a size, a material and a cost of the board into consideration, preferably, one temperature sensor is soldered on each of the front surface and the back surface of the board. In this way, the board may include two temperature sensors, and the two temperature sensors are connected to the connecting finger.

Based on the above, in order to reduce the interference of the heat generated by the current in the mainboard to the data acquisition of the temperature sensor as much as possible, in a case that the board is connected to the mainboard, a plane of the board is preferably perpendicular to a plane of the mainboard, to increase a distance between the temperature sensor and the mainboard as much as possible.

Since the temperature sensor is generally utilized to monitor whether the heat generated by the mainboard is normal in a real time manner, two temperature sensors may be respectively arranged at an air inlet and an air outlet of the mainboard, to acquire temperatures at the air inlet and the air outlet. In a case that the temperature at the air outlet greatly differs from the temperature at the air inlet, which is indicated that the heat currently generated by the mainboard is large, a speed of a related fan may be increased correspondingly.

Further, in order to reduce an error between the data acquired by the two temperature sensors as much as possible, in the case that the board is connected to the mainboard, an angle between the plane of the board and an airflow direction around the mainboard may be not greater than a preset threshold. For example, the preset threshold may be 10°, 5°, or even 0°.

Specifically, for the board and the mainboard, both the connection between the temperature sensor and the connecting finger on the board, and the plugging between the connecting finger on the board and the slot on the mainboard may be implemented by electrical connection with a pin.

Figure 2:
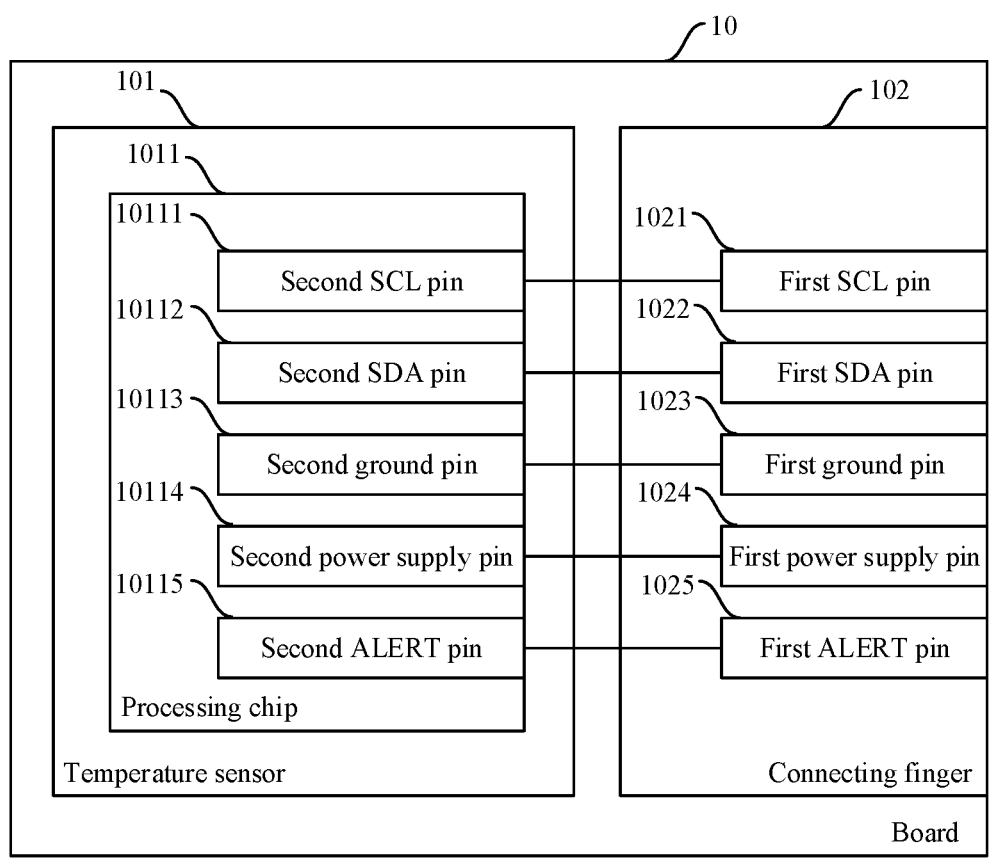
FIG. 2 is a schematic diagram of a board according to another embodiment of the present disclosure.

In an embodiment of the present disclosure, as shown in FIG. 2, the connecting finger 102 includes: a first SCL pin 1021, a first SDA pin 1022, a first ground pin 1023, a first power supply pin 1024, and a first ALERT pin 1025.

In the case that the connecting finger 102 is plugged with the slot, the first SCL pin 1021 is connected to a SCL pin in the slot, the first SDA pin 1022 is connected to a SDA pin in the slot, the first ground pin 1023 is connected to a ground pin in the slot, the first power supply pin 1024 is connected to a power supply pin in the slot, and the first ALERT pin 1025 is connected to an ALERT pin in the slot.

Each of the one or more temperature sensors 101 includes a processing chip 1011. The processing chip includes: a second SCL pin 10111 connected to the first SCL pin 1021, a second SDA pin 10112 connected to the first SDA pin 1022, a second ground pin 10113 connected to the first ground pin 1023, a second power supply pin 10114 connected to the first power supply pin 1024, and a second ALERT pin 10115 connected to the first ALERT pin 1025.

Each of the one or more temperature sensors 101 is configured to: convert the current values to a binary code by using the processing chip; output the binary code to the mainboard via the second SCL pin and the second SDA pin in the processing chip in the case that the connecting finger 102 is plugged with the slot; and output an alert signal to the mainboard via the second ALERT pin in the processing chip by using the processing chip if it is determined that the current value is not in a preset threshold range and the connecting finger is plugged with the slot.

Specifically, the SCL pin is utilized to transmit an I2C (Inter-Integrated Circuit)_SCL signal, the SDA pin is utilized to transmit an I2C_SDA signal, the ground pin is connected to the ground, the power supply pin is connected to a power supply, and the ALERT pin is utilized to transmit an I2C_ALERT signal.

In an I2C bus, a SDA and a SCL from a serial bus, and data may be transmitted and received by using the SDA and the SCL. In addition, the I2C bus is powered by using the ground pin and the power supply pin.

Therefore, after the temperature sensor acquires a temperature, the temperature sensor may convert the temperature into a current value and convert the current value into a binary code by an internal conversion, and then the temperature sensor transmits the binary code to the mainboard sequentially via the connecting finger and the slot by using the SCL pin and the SDA pin. Specifically, the temperature sensor may transmit the binary code to a BMC on the mainboard. The BMC may perform temperature control processing based on the binary code.

For example, the BMC may reversely convert the binary code into a temperature. It is assumed that the BMC can acquire temperatures of the mainboard at the air inlet and the air outlet after the conversion. In this case, the BMC may determine whether the heat currently generated by the mainboard is normal based on a difference between the temperatures of the mainboard at the air inlet and the air outlet, to determine whether to perform the temperature control processing. It can be seen that in order to perform the temperature control processing, the BMC needs to acquire temperatures of the mainboard at different positions.

For any one temperature sensor, in a case that a temperature acquired by the temperature sensor, such as the temperature of the mainboard at the air outlet, is not in a preset threshold range, the temperature sensor may output an alert signal to the mainboard directly via the ALERT pin and sequentially via the connecting finger and the slot. The BMC on the mainboard may perform abnormal processing after receiving the alert signal.

In an embodiment of the present disclosure, the one or more temperature sensors 101 include a first temperature sensor and a second temperature sensor connected in series with each other.

The processing chip of the first temperature sensor further includes an ADD pin connected to the second ground pin in the processing chip of the first temperature sensor.

The first temperature sensor is further configured to output a low level signal to the mainboard before the binary code is outputted to the mainboard.

The processing chip of the second temperature sensor further includes an ADD pin connected to the second power supply pin in the processing chip of the second temperature sensor.

The second temperature sensor is further configured to output a high level signal to the mainboard before the binary code is outputted to the mainboard.

Specifically, for a board, in a case that two temperature sensors are integrated on the board, the two temperature sensors may be connected in parallel or in series with each other. In consideration of a limited number of signals received by the mainboard in actual applications, the two temperature sensors are preferably connected in series with each other.

For a board, in a case that two temperature sensors soldered on the board are connected in series with each other, the two temperature sensors output binary codes to the mainboard via a same signal transmission channel. In order to distinguish one of the outputted binary codes from the other, the processing chip of each of the two temperature sensors may further include an ADD pin in addition to the five pins described above. The ADD pin in one of the two temperature sensors may be connected to a ground pin to be connected to the ground, and the ADD pin in the other of the two temperature sensors may be connected to a power supply pin so as to be connected to a power supply.

For two temperature sensors connected in series with each other that are integrated on a board, if one of the two temperature sensors is to output a to-be-transmitted binary code to the mainboard, the temperature sensor may firstly output a low level signal such as 0, and then output the to-be-transmitted binary code in a preset time period in a case that the ADD pin in the temperature sensor is connected to the ground. Further, the temperature sensor may firstly output a high level signal such as 1, and then output the to-be-transmitted binary code within a preset time period in a case that the ADD pin in the temperature sensor is connected to a power supply.

In summary, in the embodiment of the present disclosure, one temperature sensor is soldered on each of the front surface and the back surface of the board, so that data acquisition accuracy error of a single temperature sensor can be avoided with the design of two temperature sensors, thereby improving the temperature acquisition accuracy. Further, the temperature sensor is directly connected to the mainboard via the board, so that the temperature sensor can be timely and easily replaced in a case that the temperature sensor is damaged, which reduces the maintenance cost.

Figure 3:
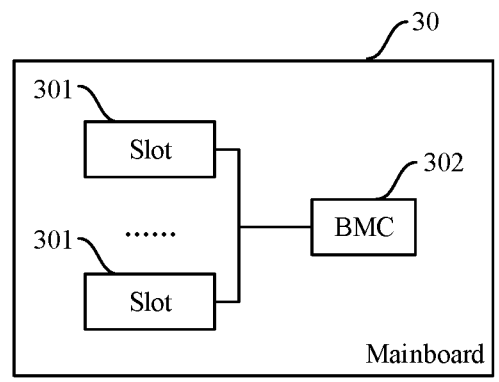
FIG. 3 is a schematic diagram of a mainboard according to an embodiment of the present disclosure.

As shown in FIG. 3, a mainboard 30 is provided according to an embodiment of the present disclosure.

The mainboard 30 includes one or more slots 301 and a BMC 302.

The BMC 302 is connected to the one or more slots 301.

Each of the one or more slots 301 is arranged to be plugged with a connecting finger on an external board to connect the board to the mainboard 30.

The BMC is configured to: receive, for each of the one or more slots 301, one or more current values outputted by a first board in a case that the slot is plugged with the connecting finger on the first board; determine a temperature around the first board based on the one or more current values; and determine whether one or more determined temperatures meet a predetermined temperature regulation requirement, and perform temperature control processing in a case that the one or more determined temperatures meet the predetermined temperature regulation requirement.

Specifically, a position of the slot may be determined based on different actual application requirements, for example, the slot may be arranged at a position at which a temperature change needs to be monitored.

As mentioned above, since the temperature sensor is generally utilized to monitor whether the heat generated by the mainboard is normal in a real time manner, two slots may be respectively arranged at an air inlet and an air outlet of the mainboard, and are connected to temperature sensors, to acquire temperatures at the air inlet and the air outlet by the temperature sensors. In a case that the temperature at the air outlet greatly differs from the temperature at the air inlet, which is indicated that the heat currently generated by the mainboard is large, a speed of a related fan may be increased correspondingly.

The mainboard may include one or more slots. The one or more slots may be arranged in at least one of the following manners: one slot is arranged at the air inlet of the mainboard; one slot is arranged at the air outlet of the mainboard; one slot is arranged at each of the air inlet and the air outlet of the mainboard; multiple slots are arranged at the air inlet of the mainboard; multiple slots are arranged at the air outlet of the mainboard; and multiple slots are arranged at both the air inlet and the air outlet of the mainboard.

In consideration of factors such as a position, occupied space, a material of the slot, and the data collection accuracy, preferably, one slot is arranged at each of the air inlet and the air outlet of the mainboard.

Figure 4:
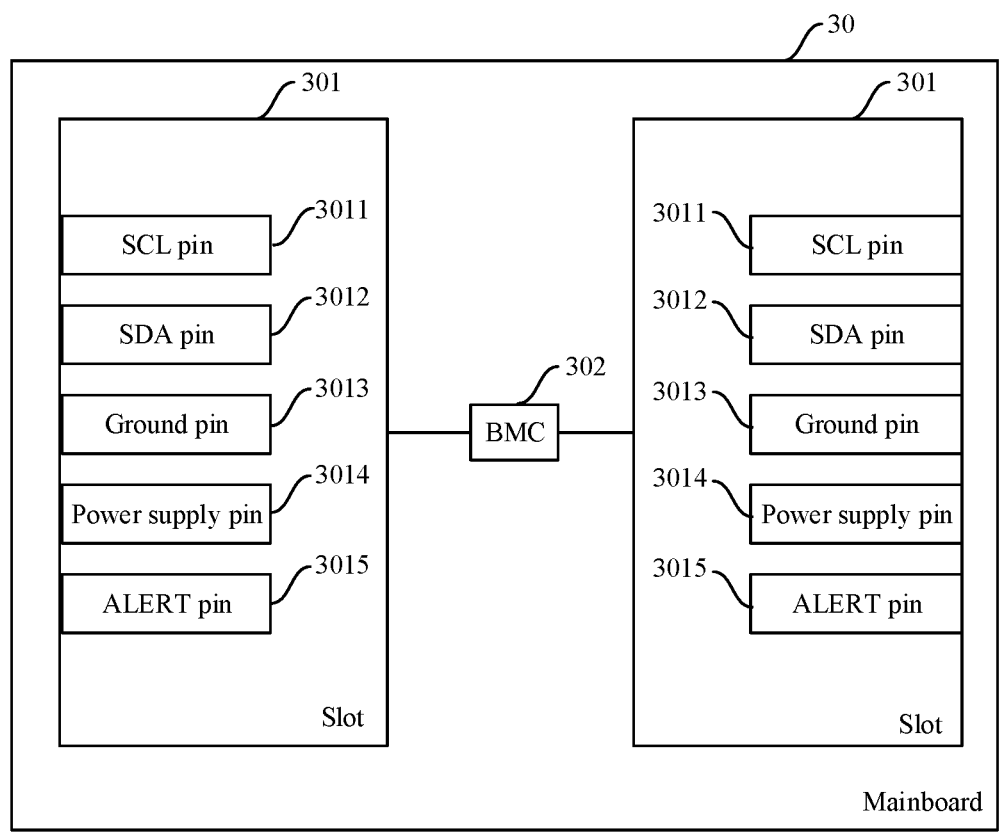
FIG. 4 is a schematic diagram of a mainboard according to another embodiment of the present disclosure.

In an embodiment of the present disclosure, as shown in FIG. 4, the one or more slots 301 include a first slot at an air inlet of the mainboard and a second slot at an air outlet of the mainboard.

The one or more current values include two current values.

The temperature regulation requirement includes a formula (1) that is expressed as:

$$\begin{cases} \Delta T = T_2 - T_1 - T_0 \\ \quad \Delta T > 0 \end{cases} \quad (1)$$

$\Delta T$ is a temperature control difference; $T_2$ is a temperature around a board when the second slot is plugged with a connecting finger on the board; $T_1$ is a temperature around another board when the first slot is plugged with a connecting finger on the board; and $T_0$ is a preset standard difference.

The BMC 302 is configured to: determined, based on a predetermined conversion curve between different current values and different temperatures, a temperature corresponding to an average of the two current values as a temperature around the first board; determine whether two determined temperatures meet the first formula; and determine, based on a predetermined correspondence between different temperature control differences and different fan speeds, a target fan speed corresponding to a temperature control difference of the two temperatures and adjust a speed of an external fan to the target fan speed to perform the temperature control processing, in a case that the two determined temperatures meet the first formula.

Specifically, for any one slot, if the BMC receives two current values, it is indicated that the board connected to the slot is provided with two temperature sensors.

For any one slot, after the BMC receives two current values transmitted by each of the two temperature sensors on the board connected to the slot, the BMC may firstly calculate an average of the two current values, to eliminate or reduce the data acquisition error of a single temperature sensor, and then determine, based on a conversion curve between different current values and different temperatures that is predetermined by a user, a temperature corresponding to the average as a temperature around the board connected to the slot.

Specifically, in the embodiment of the present disclosure, in a case that two slots are respectively arranged at the air inlet and the air outlet of the mainboard, the BMC may determine two temperatures, i.e., temperatures at the air inlet and the air outlet.

In this way, whether the heat currently generated by the mainboard is normal can be determined from the above formula (1) based on the two determined temperatures. The standard difference in the above formula (1) is determined by the user according to experiences. Specifically, the standard difference may usually indicate theoretical heat generated by the mainboard during a normal operation. For example, in a case that the two determined temperatures meet the above formula (1), it may be considered that the heat currently generated by the mainboard is overrange, and heat dissipation processing may be performed to regulate the temperature. In addition, in a case that the two determined temperatures do not meet the above formula (1), it may be considered that the heat currently generated by the mainboard is in an acceptable range, and the current process may be ended.

In addition, in another embodiment of the present disclosure, the slots may be arranged at other positions than the air inlet and the air outlet according to the different actual application requirements. Specifically, the temperature regulation requirement varies with a position of the slot on the mainboard. For example, if a real-time temperature change at a position on the mainboard needs to be monitored, one or more slots may be arranged only at the position, and the temperature regulation requirement may be determined as that the temperature at the position is not greater than a standard value. In a case that the temperature determined by the BMC does not meet the temperature regulation requirement, the temperature control processing may be performed.

In an embodiment of the present disclosure, in order to connect a temperature sensor on a board indirectly to the mainboard by the plugging between a connecting finger and a slot, reference is made to FIG. 4. Each slot 301 includes: a SCL pin 3011, a SDA pin 3012, a ground pin 3013, a power supply pin 3014, and an ALERT pin 3015.

Specifically, the types and the number of pins in the connecting finger are the same as those in the slot. In the case that the connecting finger is plugged with the slot, different types of the pins in the connecting finger are correspondingly connected to the pins in the slot.

Figure 5:
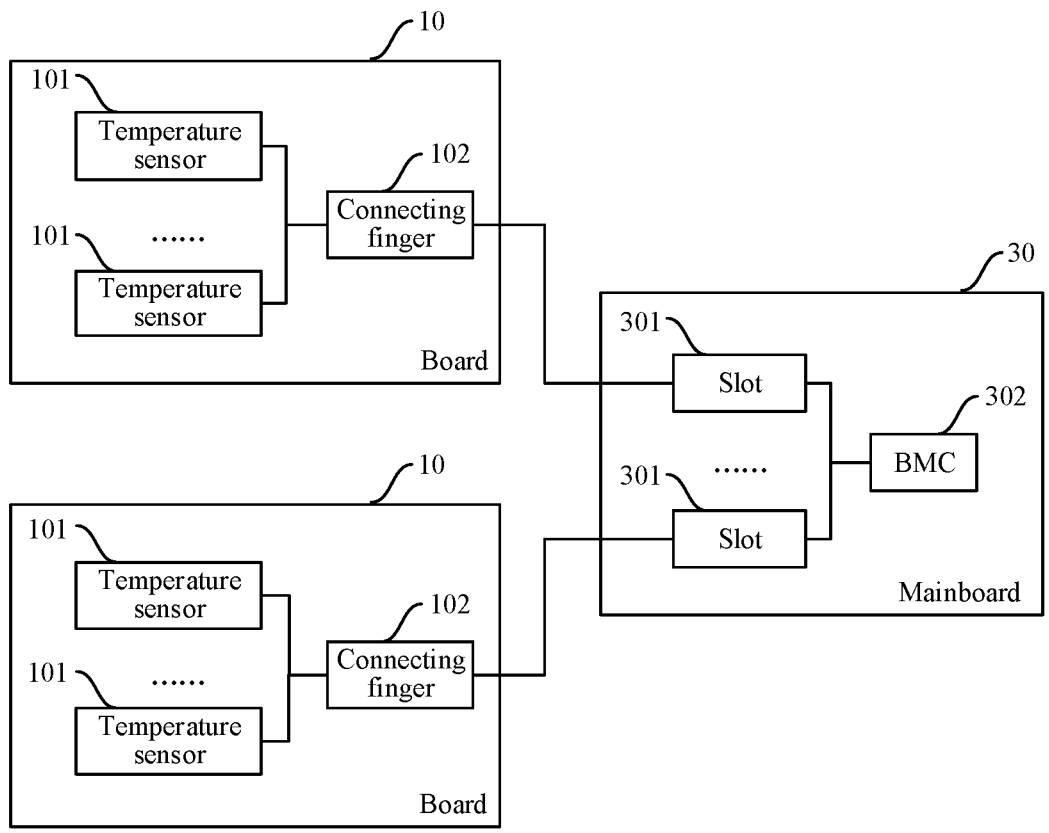
FIG. 5 is a schematic diagram of a system for monitoring a temperature according to an embodiment of the present disclosure.

As shown in FIG. 5, a system for monitoring a temperature is provided according to an embodiment of the present disclosure.

The system includes: one or more boards 10 described above, and the mainboard 30 described above.

For each slot 301 on the mainboard 30, in a case that the slot is plugged with a connecting finger on any one of the boards, the board is connected to the mainboard 30.

Figure 6:
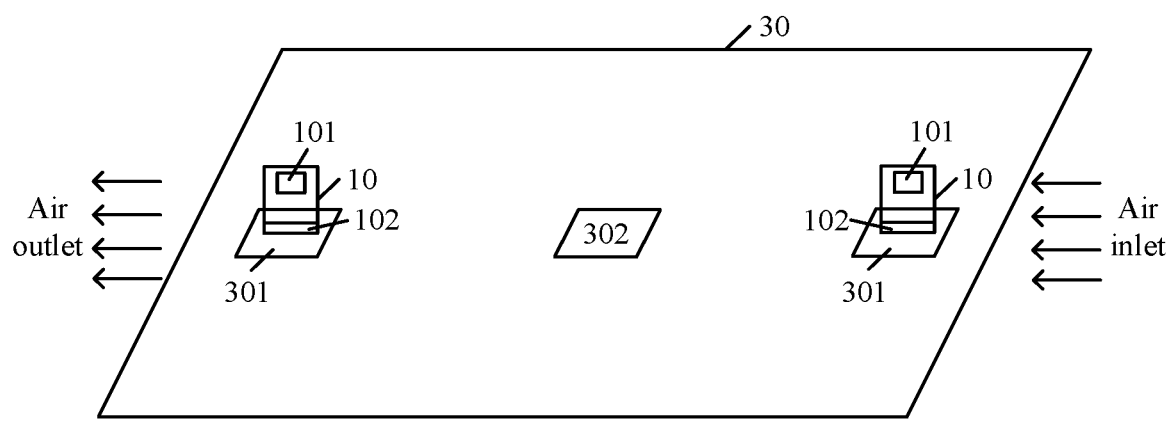
FIG. 6 is a schematic structural diagram of a system for monitoring a temperature according to an embodiment of the present disclosure.

In an embodiment of the present disclosure, reference is made to FIG. 6, which is a schematic structural diagram of a system for monitoring a temperature according to an embodiment of the present disclosure. As can be seen from FIG. 6, two slots are integrated on the mainboard. One slot is arranged at an air inlet of the mainboard, which may be referred to as a right slot. The other slot is arranged at an air outlet of the mainboard, which may be referred to as a left slot. Each of the two slots is plugged with a connecting finger of one board on which two temperature sensors are integrated. The two temperature sensors integrated on one board may be respectively soldered on the front and back surfaces of the board. The temperature sensor soldered on the front surface of the board is as shown in FIG. 6, and the temperature sensor soldered on the back surface of the board is not shown in FIG. 6.

As shown in FIG. 6, connecting fingers of the two boards are respectively plugged with the two slots on the mainboard, a plane of each of the two boards is perpendicular to a plane of the mainboard, and an angle between the plane of the board and the airflow direction is quite small, which may be, for example, 0°, to reduce the data acquisition accuracy of the two temperature sensors on each board.

A temperature regulation requirement may be prestored in the BMC on the mainboard. Since the board is connected to the mainboard by the plugging between the connecting finger on the board and the slot on the mainboard, the BMC on the mainboard may receive current values outputted by the temperature sensors on the board, determine whether the temperature regulation requirement is met based on the received current values, and determine whether to perform the temperature control processing based the determination result, so as to match the current heat dissipation with the current heat generation of the mainboard.

In summary, the temperature sensor is indirectly connected to the mainboard via the board, which reduces or even avoids interference of the heat generated by an internal current in the mainboard or other modules on the mainboard to the data acquisition of the temperature sensor, and improves ambient temperature sensing accuracy and precision of the temperature sensor, thereby improving the accuracy of the heat dissipation processing, ensuring the normal heat dissipation of the mainboard, and improving a service life of the mainboard.

Figure 7:
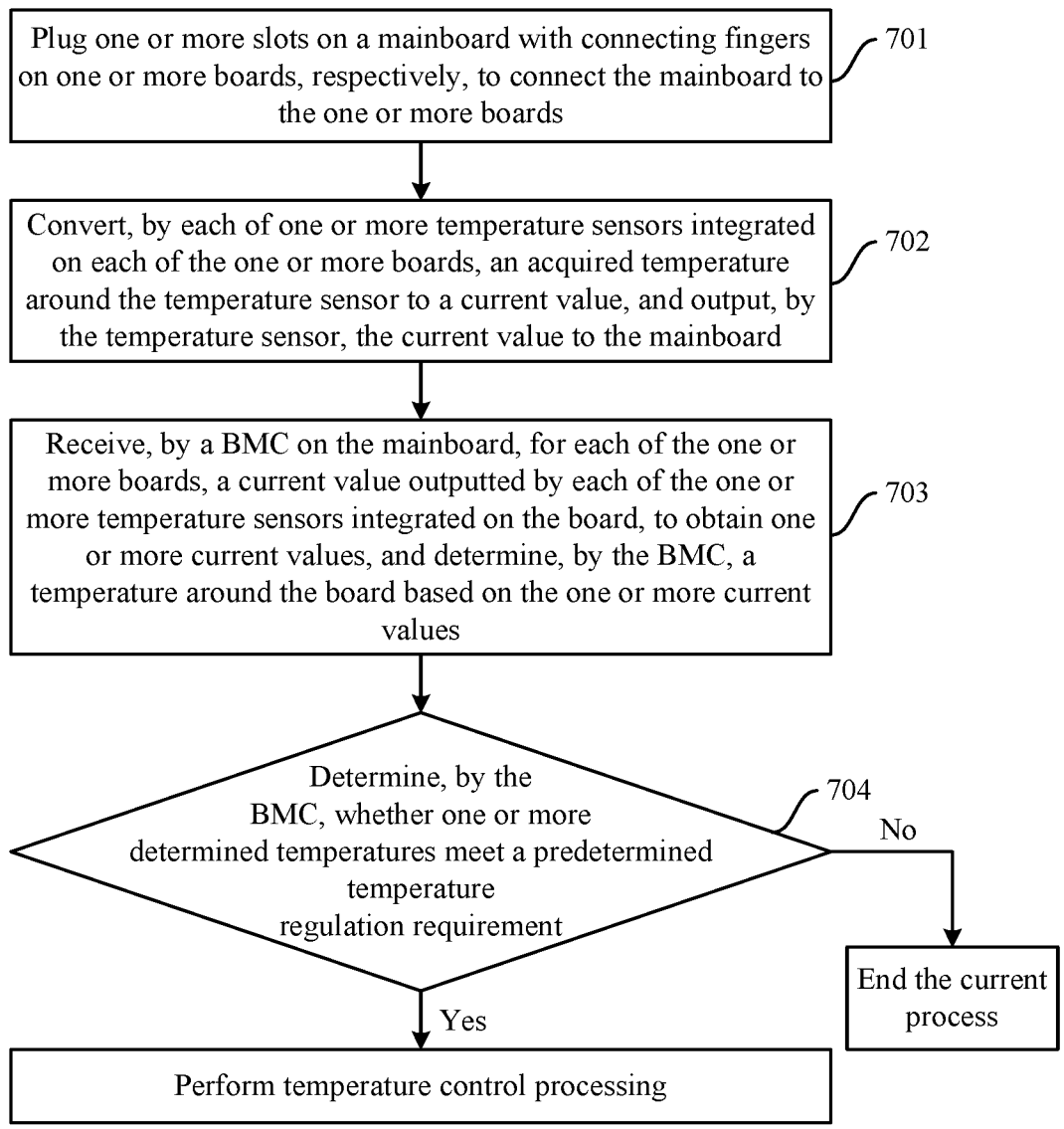
FIG. 7 is a flowchart showing a method for monitoring a temperature with a system for monitoring a temperature according to an embodiment of the present disclosure.

As shown in FIG. 7, there is provided a method for monitoring a temperature with the system for monitoring a temperature described above according to an embodiment of the present disclosure. The method includes the following steps 701 to 704.

In step 701, one or more slots on a mainboard are respectively plugged with connecting fingers on one or more boards, to connect the mainboard to the one or more boards.

In step 702, each of one or more temperature sensors integrated on each of the one or more boards converts an acquired temperature around the temperature sensor to a current value, and outputs the current value to the mainboard.

In step 703, for each of the one or more boards, the BMC on the mainboard receives a current value outputted by each of the one or more temperature sensors integrated on the board, to obtain one or more current values, and determines a temperature around the board based on the one or more current values.

In step 704, the BMC determines whether one or more determined temperatures meet a predetermined temperature regulation requirement, and performs temperature control processing in a case that the one or more determined temperatures meet the predetermined temperature regulation requirement, otherwise ends the current process.

In an embodiment of the present disclosure, the one or more slots include a first slot at an air inlet of the mainboard and a second slot at an air outlet of the mainboard.

The one or more current values include two current values.

The temperature regulation requirement includes the above formula (1).

The determining a temperature around the board based on the one or more current value may be performed by determining, based on a predetermined conversion curve between different current values and different temperatures, a temperature corresponding to an average of the two current values as the temperature around the board.

The determining whether one or more determined temperatures meet a predetermined temperature regulation requirement and performing temperature control processing in a case that the one or more determined temperatures meets the predetermined temperature regulation requirement may be performed by steps including: determining whether the two determined temperatures meet the first formula; and determining, based on a predetermined correspondence between different temperature control differences and different fan speeds, a target fan speed corresponding to a temperature control difference of the two temperatures and adjusting a speed of an external fan to the target fan speed to perform the temperature control processing, in a case that the two determined temperatures meet the first formula.

In summary, the embodiments of the present disclosure have at least the following beneficial effects.

In a first aspect, a board is provided according to an embodiment of the present disclosure, which includes one or more temperature sensors and a connecting finger. The one or more temperature sensors are integrated on the board and are connected to the connecting finger. The connecting finger is arranged to be plugged with a slot on an external mainboard to connect the board to the mainboard. Each of the one or more temperature sensors is configured to:

convert an acquired temperature around the temperature sensor to a current value, and output the current value to the mainboard in a case that the connecting finger is plugged with the slot. The temperature sensor is connected to the mainboard via the plugging between the board and the mainboard, rather than being arranged on the mainboard, which reduces or avoids interference of heat generated by a current in the mainboard to data acquisition. Therefore, temperature monitoring accuracy can be improved with the present disclosure.

In a second aspect, in an embodiment of the present disclosure, one temperature sensor is soldered on each of the front surface and the back surface of the board, so that data acquisition accuracy error of a single temperature sensor can be avoided with the design of two temperature sensors, thereby improving the temperature acquisition accuracy. Further, the temperature sensor is directly connected to the mainboard via the board, so that the temperature sensor can be timely and easily replaced in a case that the temperature sensor is damaged, which reduces the maintenance cost.

In a third aspect, in an embodiment of the present disclosure, the temperature sensor is indirectly connected to the mainboard via the board, which reduces or even avoids interference of the heat generated by an internal current in the mainboard or other modules on the mainboard to the data acquisition of the temperature sensor, and improves ambient temperature sensing accuracy and precision of the temperature sensor, thereby improving the accuracy of the heat dissipation processing, ensuring the normal heat dissipation of the mainboard, and improving a service life of the mainboard.

It should be noted that relationship terminologies herein such as "first", "second" are only used to distinguish one entity or operation from another entity or operation, rather than necessitating or implying an actual relationship or order between the entities or operations. Further, terms such as "include", "comprise" or any other variations thereof are intended to be non-exclusive. Therefore, a process, method, article or device including a series of elements includes not only the elements but also other elements that are not enumerated, or further includes the elements inherent for the process, method, article or device. Unless expressively limited otherwise, an element defined by the statement "comprising (including) a . . . " does not exclude the case that the process, method, article or device including the element may include other similar elements.

It can be understood by those skilled in the art that all or some of steps in the method embodiment may be implemented by hardware instructed by a program. The program may be stored in a computer-readable storage medium. When the program is performed, steps included in the above method embodiment can be performed. The storage medium may include a ROM, a RAM, a magnetic disk, an optical disk and other media that may store program codes.

It should be noted that the above only illustrates preferred embodiments of the present disclosure, and is only intended to describe the technical solutions of the present disclosure, and not to limit the protection scope of the present disclosure. Any modifications, equivalent replacements and variations made within the spirit and principle of the present disclosure shall fall within the protection scope of the present disclosure.

The invention claimed is:

1. A board, comprising:
one or more temperature sensors; and
a connecting finger, wherein
the one or more temperature sensors are integrated on the board and are connected to the connecting finger;
the connecting finger is arranged to be plugged with a slot on an external mainboard to connect the board to the mainboard; and
each of the one or more temperature sensors is configured to: convert an acquired temperature around the temperature sensor to a current value, and output the current value to the mainboard in a case that the connecting finger is plugged with the slot,
wherein the connecting finger comprises:
a first serial clock line SCL pin;
a first serial data line SDA pin;
a first ground pin;
a first power supply pin; and
a first alert ALERT pin, wherein
in the case that the connecting finger is plugged with the slot, the first SCL pin is connected to a SCL pin in the slot, the first SDA pin is connected to a SDA pin in the slot, the first ground pin is connected to a ground pin in the slot, the first power supply pin is connected to a power supply pin in the slot, and the first ALERT pin is connected to an ALERT pin in the slot;
each of the one or more temperature sensors comprises a processing chip, and the processing chip comprises: a second SCL pin connected to the first SCL pin, a second SDA pin connected to the first SDA pin, a second ground pin connected to the first ground pin, a second power supply pin connected to the first power supply pin, and a second ALERT pin connected to the first ALERT pin, and
each of the one or more temperature sensors is configured to: convert the current value to a binary code by using the processing chip, output the binary code to the mainboard via the second SCL pin and the second SDA pin in the processing chip in the case that the connecting finger is plugged with the slot and output an alert signal to the mainboard via the second ALERT pin in the processing chip by using the processing chip if it is determined that the current value is not in a preset threshold range and the connecting finger is plugged with the slot.

2. The board according to claim 1, wherein
the one or more temperature sensors comprise two temperature sensors respectively soldered on a front surface and a back surface of the board; and
in the case that the connecting finger is plugged with the slot, a plane of the board is perpendicular to a plane of the mainboard, and an angle between the plane of the board and an airflow direction around the mainboard is not greater than a preset threshold.

3. The board according to claim 1, wherein
the one or more temperature sensors comprise a first temperature sensor and a second temperature sensor connected in series with each other;
the processing chip of the first temperature sensor further comprises an address ADD pin connected to the second ground pin in the processing chip of the first temperature sensor;
the first temperature sensor is further configured to output a low level signal to the mainboard before the binary code is outputted to the mainboard;

the processing chip of the second temperature sensor further comprises an ADD pin connected to the second power supply pin in the processing chip of the second temperature sensor; and the second temperature sensor is further configured to output a high level signal to the mainboard before the binary code is outputted to the mainboard.

4. A mainboard, comprising:

one or more slots; and a baseboard management controller BMC connected to the one or more slots, wherein each of the one or more slots is arranged to be plugged with a connecting finger on an external board to connect the board to the mainboard; and the BMC is configured to: receive, for each of the one or more slots, one or more current values outputted by a first board in a case that the slot is plugged with the connecting finger on the first board; determine a temperature around the first board based on the one or more current values; and determine whether one or more determined temperatures meet a predetermined temperature regulation requirement, and perform temperature control processing in a case that the one or more determined temperatures meet the predetermined temperature regulation requirement, wherein the one or more slots comprise: a first slot at an air inlet of the mainboard and a second slot at an air outlet of the mainboard;

the one or more current values comprise two current values;

the temperature regulation requirement comprises a first formula;

the first formula is expressed as:

$$\begin{cases} \Delta T = T_2 - T_1 - T_0 \\ \quad \Delta T > 0 \end{cases}$$

$\Delta T$ is a temperature control difference; $T_2$ is a temperature around a board when the second slot is plugged with a connecting finger on the board; $T_1$ is a temperature around another board when the first slot is plugged with a connecting finger on the board; $T_0$ is a preset standard difference; and the BMC is configured to: determine, based on a predetermined conversion curve between different current values and different temperatures, a temperature corresponding to an average of the two current values as a temperature around the first board; determine whether the two determined temperatures meet the first formula; and determine, based on a predetermined correspondence between different temperature control differences and different fan speeds, a target fan speed corresponding to a temperature control difference of the two temperatures and adjust a speed of an external fan to the target fan speed to perform the temperature control processing, in a case that the two determined temperatures meet the first formula.

5. The mainboard according to claim 4, wherein each of the one or more slots comprises: a serial clock line SCL pin, a serial data line SDA pin, a ground pin, a power supply pin, and an alert ALERT pin.

6. A system for monitoring a temperature, comprising:

one or more boards, each comprising one or more temperature sensors and a connecting finger, wherein the one or more temperature sensors are integrated on the board and are connected to the connecting finger; and a mainboard, comprising one or more slots and a baseboard management controller BMC connected to the one or more slots, wherein each of the one or more slots is arranged to be plugged with the connecting finger on one of the boards, to connect the mainboard to the board;

each of the one or more temperature sensors integrated on each of the one or more boards is configured to: convert an acquired temperature around the temperature sensor to a current value, and output the current value to the mainboard in a case that the connecting finger of the board is plugged with one of the slots;

the BMC is configured to: receive, for each of the one or more slots, one or more current values outputted by a first board in a case that the slot is plugged with the connecting finger on the first board; determine a temperature around the first board based on the one or more current values; and determine whether one or more determined temperatures meet a predetermined temperature regulation requirement, and perform temperature control processing in a case that the one or more determined temperatures meet the predetermined temperature regulation requirement, and for each of the one or more slots on the mainboard, in a case that the slot is plugged with a connecting finger on any one of the boards, the board is connected to the mainboard, wherein for each of the one or more boards, the connecting finger of the board comprises: a first serial clock line SCL pin, a first serial data line SDA pin, a first ground pin, a first power supply pin and a first alert ALERT pin, and each of the one or more temperature sensors integrated on the board comprises a processing chip, and the processing chip comprises: a second SCL pin connected to the first SCL pin, a second SDA pin connected to the first SDA pin, a second ground pin connected to the first ground pin, a second power supply pin connected to the first power supply pin, and a second ALERT pin connected to the first ALERT pin;

each of the one or more slots comprises: a SCL pin, a SDA pin, a ground pin, a power supply pin, and an ALERT pin;

in a case that the connecting finger is plugged with one of the slots, the first SCL pin is connected to the SCL pin in the slot, the first SDA pin is connected to the SDA pin in the slot, the first ground pin is connected to the ground pin in the slot, the first power supply pin is connected to the power supply pin in the slot, and the first ALERT pin is connected to the ALERT pin in the slot; and each of the one or more temperature sensors integrated on the board is configured to: convert the current value to a binary code by using the processing chip; output the binary code to the mainboard via the second SCL pin and the second SDA pin in the processing chip in the case that the connecting finger is plugged with the slot and output an alert signal to the mainboard via the second ALERT pin in the processing chip by using the processing chip if it is determined that the current value is not in a preset threshold range and the connecting finger is plugged with the slot.

7. A method for monitoring a temperature with the system for monitoring a temperature according to claim 6, the method comprising:
- plugging the one or more slots on the mainboard with connecting fingers on the one or more boards, respectively, to connect the mainboard to the one or more boards;
- converting, by each of the one or more temperature sensors integrated on each of the one or more boards, the acquired temperature around the temperature sensor to the current value, and output, by the temperature sensor, the current value to the mainboard;
- receiving, by the baseboard management controller BMC on the mainboard, for each of the one or more boards, the current value outputted by each of the one or more temperature sensors integrated on the board, to obtain the one or more current values, and determining, by the BMC, the temperature around the board based on the one or more current values; and
- determining, by the BMC, whether the one or more determined temperatures meet the predetermined temperature regulation requirement, and performing temperature control processing in a case that the one or more determined temperatures meet the predetermined temperature regulation requirement, wherein the one or more slots comprise: a first slot at an air inlet of the mainboard and a second slot at an air outlet of the mainboard;

the one or more current values comprise two current values;

the temperature regulation requirement comprises a first formula;

the first formula is expressed as:

$$\begin{cases} \Delta T = T_2 - T_1 - T_0 \\ \quad \Delta T > 0 \end{cases}$$

$\Delta T$ is a temperature control difference; $T_2$ is a temperature around a board when the second slot is plugged with a connecting finger on the board; $T_1$ is a temperature around another board when the first slot is plugged with a connecting finger on the board; $T_0$ is a preset standard difference;

the determining the temperature around the board based on the one or more current values comprises: determining, based on a predetermined conversion curve between different current values and different temperatures, a temperature corresponding to an average of the two current values as the temperature around the board; and the determining whether the one or more determined temperatures meet the predetermined temperature regulation requirement and performing temperature control processing in a case that the one or more determined temperatures meet the predetermined temperature regulation requirement comprises: determining whether the two determined temperatures meet the first formula; and determining, based on a predetermined correspondence between different temperature control differences and different fan speeds, a target fan speed corresponding to a temperature control difference of the two temperatures and adjusting a speed of an external fan to the target fan speed to perform the temperature control processing, in a case that the two determined temperatures meet the first formula.

8. The system for monitoring a temperature according to claim 6, wherein for each of the one or more boards,
- the one or more temperature sensors integrated on the board comprise two temperature sensors respectively soldered on a front surface and a back surface of the board; and
- in a case that the connecting finger of the board is plugged with a slot, a plane of the board is perpendicular to a plane of the mainboard, and an angle between the plane of the board and an airflow direction around the mainboard is not greater than a preset threshold.

9. The system for monitoring a temperature according to claim 6, wherein
- the one or more temperature sensors comprise a first temperature sensor and a second temperature sensor connected in series with each other;
- the processing chip of the first temperature sensor further comprises an address ADD pin connected to the second ground pin in the processing chip of the first temperature sensor;
- the first temperature sensor is further configured to output a low level signal to the mainboard before the binary code is outputted to the mainboard;
- the processing chip of the second temperature sensor further comprises an ADD pin connected to the second power supply pin in the processing chip of the second temperature sensor; and
- the second temperature sensor is further configured to output a high level signal to the mainboard before the binary code is outputted to the mainboard.

10. The system for monitoring a temperature according to claim 6, wherein
- the one or more slots comprise: a first slot at an air inlet of the mainboard and a second slot at an air outlet of the mainboard;
- the one or more current values comprise two current values;
- the temperature regulation requirement comprises a first formula;
- the first formula is expressed as:

$$\begin{cases} \Delta T = T_2 - T_1 - T_0 \\ \quad \Delta T > 0 \end{cases}$$

$\Delta T$ is a temperature control difference; $T_2$ is a temperature around a board when the second slot is plugged with a connecting finger on the board; $T_1$ is a temperature around another board when the first slot is plugged with a connecting finger on the board; $T_0$ is a preset standard difference; and the BMC is configured to: determine, based on a predetermined conversion curve between different current values and different temperatures, a temperature corresponding to an average of the two current values as a temperature around the first board; determine whether the two determined temperatures meet the first formula; and determine, based on a predetermined correspondence between different temperature control differences and different fan speeds, a target fan speed corresponding to a temperature control difference of the two temperatures and adjust a speed of an external fan to the target fan speed to perform the temperature control processing, in a case that the two determined temperatures meet the first formula.

* * * * *